United States Patent [19]
Paul et al.

[11] Patent Number: 5,168,846
[45] Date of Patent: Dec. 8, 1992

[54] ROTARY ENGINE WITH VARIABLE DISPLACEMENT

[76] Inventors: Marius A. Paul; Ana Paul, both of 969 La Paz Rd., Placentia, Calif. 92670

[21] Appl. No.: 715,411
[22] Filed: Jun. 14, 1991
[51] Int. Cl.$^5$ .................... F02B 53/06; F02B 53/10
[52] U.S. Cl. .................... 123/202; 123/205; 123/208; 123/218; 123/299; 418/159
[58] Field of Search .............. 123/202, 205, 208, 216, 123/218, 242, 299, 300; 418/159

[56] References Cited

U.S. PATENT DOCUMENTS

| | | | |
|---|---|---|---|
| 3,288,120 | 11/1966 | Lamm et al. | 123/208 X |
| 3,359,955 | 12/1967 | Turner | 123/218 |
| 3,446,190 | 5/1969 | Bensinger et al. | 123/202 |
| 3,762,376 | 10/1973 | Eberle et al. | 123/242 |
| 3,844,256 | 10/1974 | Ishikawa et al. | 123/242 |
| 3,886,911 | 6/1975 | Glatt | 123/242 |
| 4,388,901 | 6/1983 | Kodama et al. | 123/213 |
| 4,843,813 | 7/1989 | Paul | 417/407 |
| 5,022,366 | 6/1991 | Abraham et al. | 123/205 |

Primary Examiner—Michael Koczo
Attorney, Agent, or Firm—Bielen, Peterson & Lampe

[57] ABSTRACT

A rotary engine having an epitrochoidal engine component and a supercharger component connected to the engine component by a variable transmission, the engine component having valve plugs for varying the effective displacement of air compression according to engine load and speed, the engine component having a regional combustion chamber design and fuel injection system designed to improve the timing and completeness of combustion.

13 Claims, 5 Drawing Sheets

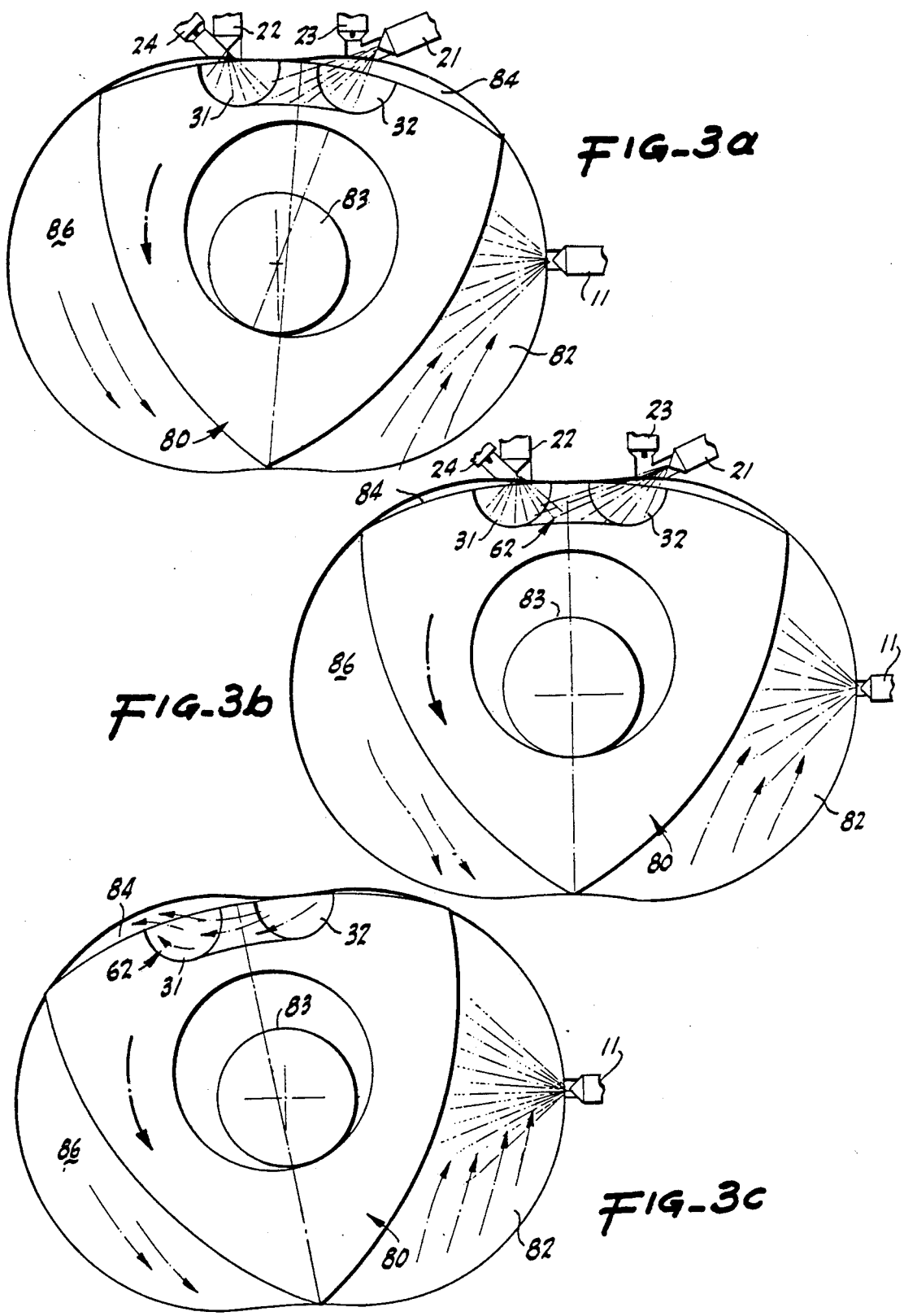

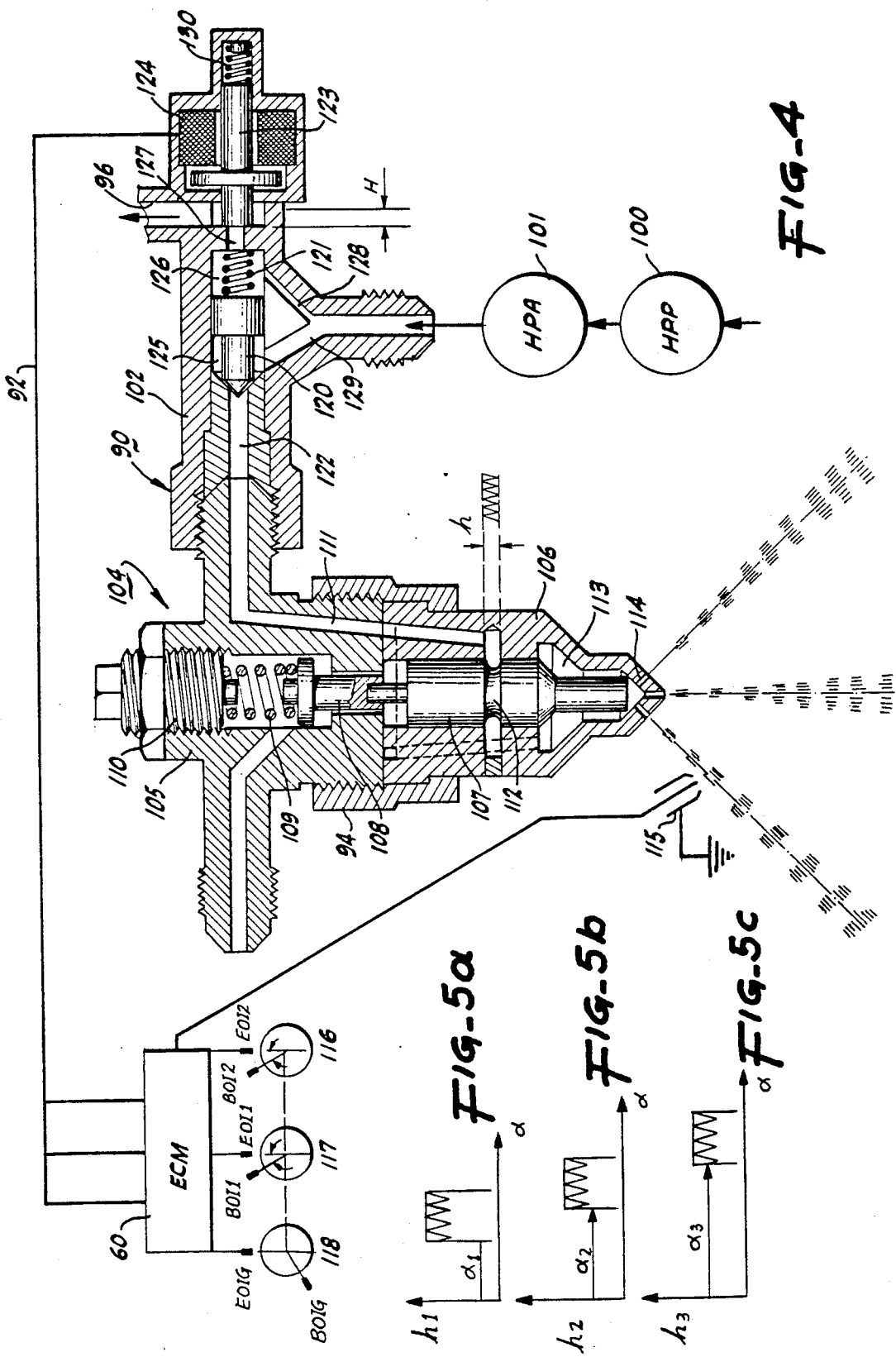

ROTARY ENGINE WITH VARIABLE DISPLACEMENT

BACKGROUND OF THE INVENTION

This invention relates to improvements in rotary engines and in particular, relates to mechanisms for adjusting the compression chamber volume of a rotary engine, such that the effective displacement is varied, and relates to systems for delivering fuel to effect complete, fuel efficient combustion under varied operating conditions.

Rotary engines, particularly the Wankel-type engine which has found use in automotive applications, suffer from several recognized drawbacks that limit their performance and efficiency. These historic problems have penalized the general adoption of rotary engines, in spite of the fundamental advantage of a rotary piston for production of power to a rotational output shaft.

Among some of the recognized problems are:

the sealing system of the linear, one-blade, apex seal which is subjected to the full pressure differential between the two adjacent chambers on each side of the seal;

the design limitations on the maximum peripheral speed of conventional apex seals along the internal chamber wall of the housing;

the low rate of ignition and combustion of the fuel air mixture in the elongated, "bath-tub" shaped, combustion chamber that is continuously modified in volume and shape during compression and combustion in a manner that impedes effective combustion;

poor specific fuel consumption, with unusually high specific fuel consumption at part loads similar to gas turbines because of a fixed cycle configuration;

limited capability for supercharging spark ignited rotary engines that are provided with a carbureted or injected fuel intake because of preignition detonation; and limited improvement in specific fuel consumption and supercharging levels rotary engines designs having staged pilot and main injection fueling systems enabling multi-fuel capability.

Common to the problems in the state of the art technologies attempting to improve the performance of rotary engines is the reliance on designs which retain the constant displacement of the intake/compression side of the engine. This design feature presents an obstacle to attempts to raise the power density by employing high levels of supercharging since the fixed chamber configuration requires the use of a "waste gate" for turbocharged rotary engines and results in overfueling to maintain combustion at less than optimum loads.

It would be desirable to devise a system that enables the power density of a rotary engine to be improved by a very high supercharging level and to maintain a flat specific fuel consumption by constant combustion pressure and constant compression pressure at high and low load, and at high and low rotation.

The improved rotary engine design of this invention incorporates novel features to solve the problems that exist in current, fixed geometry, rotary engines, particularly standard chamber configurations of Wankel-type epitrochoidal engines.

SUMMARY OF THE INVENTION

This invention relates to improvements in rotary engines and in particular to improvements in the combustion chamber design and fuel delivery system that is especially applicable to Wankel-type engines of epitrochoidal configuration using a three lobe piston in a standard configuration having a single intake and single exhaust during a rotation of a piston.

This invention adapts the mechanism described in our patent application entitled, CONTINUOUS EXTERNAL HEAT ENGINE filed May 21, 1991, Ser. No. 704,293, relating to variable displacement chambers for rotary engines.

This invention also adapts novel fuel delivery systems and precombustion chamber configurations of our high-pressure reciprocal engine designs to rotary engines by unique modifications.

In our preferred embodiment the novel internal combustion rotary engine of this invention is combined through a variable transmission with a counter rotating turbocharger as described in the patent of one of the inventors, Marius Paul, entitled COMPACT TURBO-COMPRESSOR UNIT, U.S. Pat. No. 4,843,813, issued Jul. 4 1989.

In the preferred embodiment of this invention, a variable geometry intake, conducting intake gases to a resulting variable displacement compression chamber allows optimization of the engine performance according to the level of load, rotation, and supercharging pressure as monitored by appropriate sensors and regulated by the incorporated control mechanisms.

Additionally, the combustion process is substantially improved by incorporation of a precombustion chamber into the faces of the rotary piston and inclusion of a staged, pulsed fuel injection system and a staged, multiple source, ignition system. These designs provide for optimized fuel-air mixtures that in localized volumes are highly turbulent for controlled, high-speed mixing with accelerated combustion enabling operation at high rotations with increased power and reduced pollution. In the preferred embodiment the floating apex seals of the referenced application, CONTINUOUS EXTERNAL HEAT ENGINE, are employed to maintain sealing under the more rigorous operating conditions enabled by the foregoing improvements.

All of these features combine in a harmonious, correlated-component engine that is controlled by an integrated electronic processor module. The processor module is responsible for fuel injection, spark ignition, supercharging level, variations in the supercharge transmission ratio, constant combustion pressure, pollution control and adjustment of specific fuel consumption.

All of these control functions are associated with sensors and actuators that, except for the unique components herein described, are generally known in the current state of the art of engine control and are not described in detail or separately claimed herein.

BRIEF DESCRIPTION OF THE DRAWINGS

FIGS. 3a, 3b, and 3c and 3d are schematic illustrations of the engine rotor and chamber with different rotor positions.

FIG. 4 is an enlarged, cross-sectional view of the fuel injector.

FIGS. 5a, 5b, and 5c are diagrammatic illustrations of the staged injector sequence.

FIG. 6 is a top view of the engine rotor of FIG. 3a.

DESCRIPTION OF THE PREFERRED EMBODIMENTS

Figure 1:
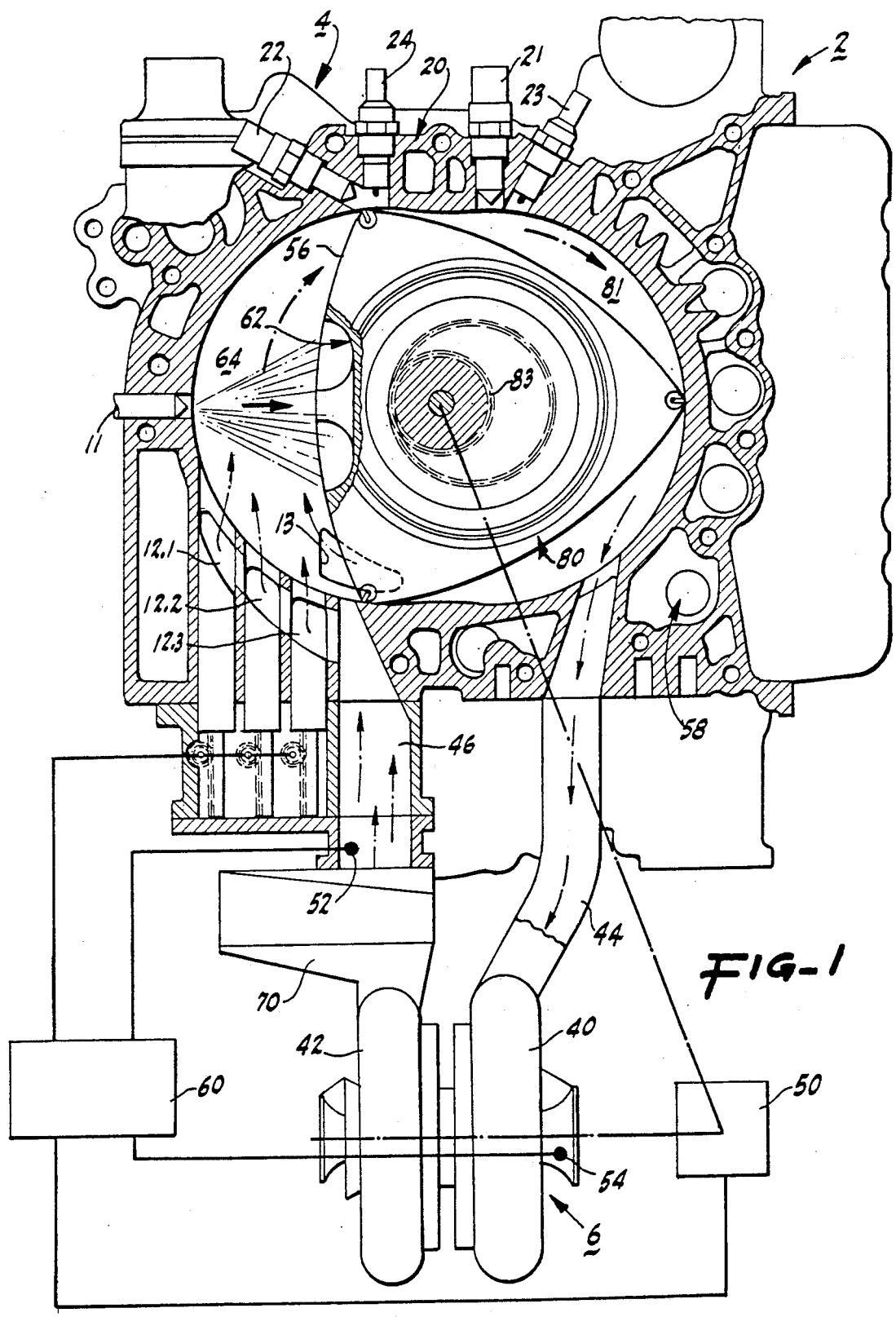
FIG. 1 is a cross-sectional view of the rotary engine with turbocharger with a schematically shown control system.

The engine assembly, designated generally by the reference numeral 2 is shown in FIG. 1. The engine assembly 2 includes a rotary engine component 4 and a turbocompressor component 6. The rotary engine component 4, includes a housing 20 forming an epitrochoidal chamber 81, a rotor 80 and an output shaft 83. The turbocompressor component 6 preferably comprises a counter rotating turbomachinery with a turbine side 40 and a compressor side 42. The turbine side 40 communicates with the exhaust passage 44 of the rotary engine component 4 and the compressor side 42 communicate with the air intake passage 46 of the engine component 4 with an intermediate intercooler 70 to increase the density of air entering the intake passage 46.

The rotary engine component 4 and the turbocompressor component 6 are interconnected by a variable transmission 50 controlled by a central processor in an electronic module 60. The electronic control module monitors engine conditions through sensors such as intake pressure sensor 52, exhaust gas analyzer sensor 54 and other common sensors (not shown) for monitoring engine speeds, load conditions, combustion temperatures and other indicators useful to regulate the transmission ratio, fuel system and intake port size as described.

In FIG. 1, the focus is on the air intake portion of the cycle. The rotor 30 is shown eclipsing the fixed size side port 13, with fixed size peripheral port 12./in the last stage of being open, and with staged peripheral ports 12.2 and 12.3 and 12.4 having adjustable plug valves 55.1, 55.2 and 55.3. in almost maximum retraction. The plug valves 55.1, 55.2 and 55.3 have extension racks 57, which engage gears 59 for individually advancing the plug valves to close the ports 12.2, 12.3 and 12.4, as described in the referenced application, CONTINUOUS EXTERNAL HEAT ENGINE. In this manner, with a plurality of displaceable plug valves, the effective volumetric displacement of the compression subchamber can be varied in stages. Since the volume of the compression subchamber for compression of contained gases does not become set until the lobe of the rotor passes the last open port 12.1, 12.2, 12.3 or 12.4, the use of retractable plug valves enables the beginning of compression to be advanced or delayed, within limits, as desired to optimized operating conditions. Each plug valve 55.1, 55.2 and 55.3 is controlled by the electronic control module 60, and, for example, retracts the plug valves in high speed operation where the turbo compressor component works optimally. During optimal operation of the turbocompressor component, the precompressed air charge from the turbocompressor component 6 is further compressed at less than maximum compression form the positive displacement rotary engine component 4. By reducing the displacement volume, a waste gate need not be employed. This positioning would occur in a high speed operation where the turbocompressor component 6 is at optimum efficiency. As shown a preliminary fuel injector 11 is injecting a spray of fuel toward the face 56 of the rotor 30 in cross flow with the air induced though the multiple ports 12.1, 12.2, 12.3, 12.4, and 13 to produce a cooling effect of the air fuel charge from the phase change in the atomized fuel by evaporation. This reduces heat rejected to the engine cooling system 58 from the compression process and permits a higher compression ratio. As shown, the spray is directed toward a precombustion chamber 62 recessed in the face 56 of the rotor 30 and assists in cooling this local hot zone during cycling of the rotor.

Figure 2:
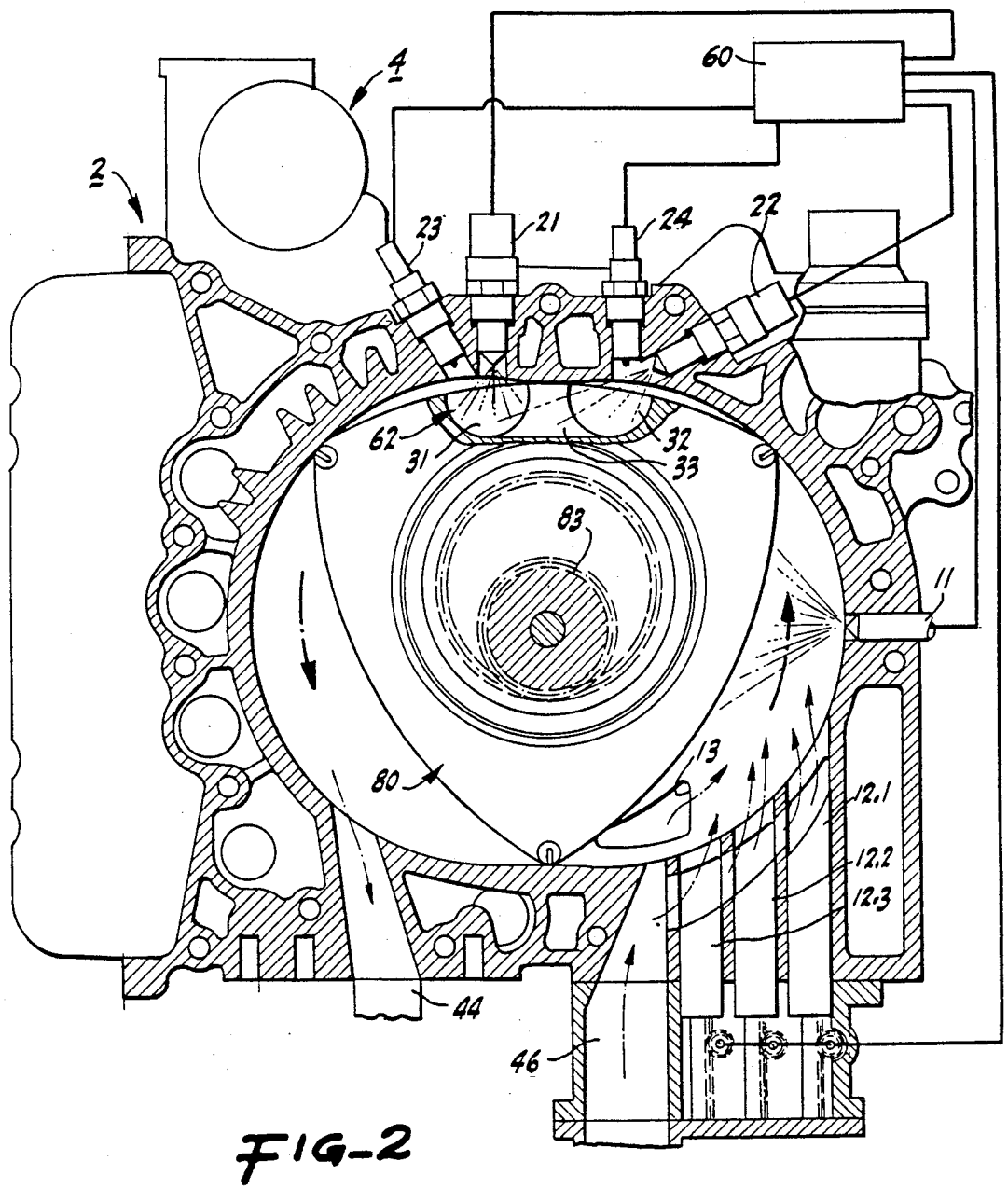
FIG. 2 is an opposite cross-sectional view of the rotary engine of FIG. 1 with the rotor in a displaced position in the cycle.
Figure 6:
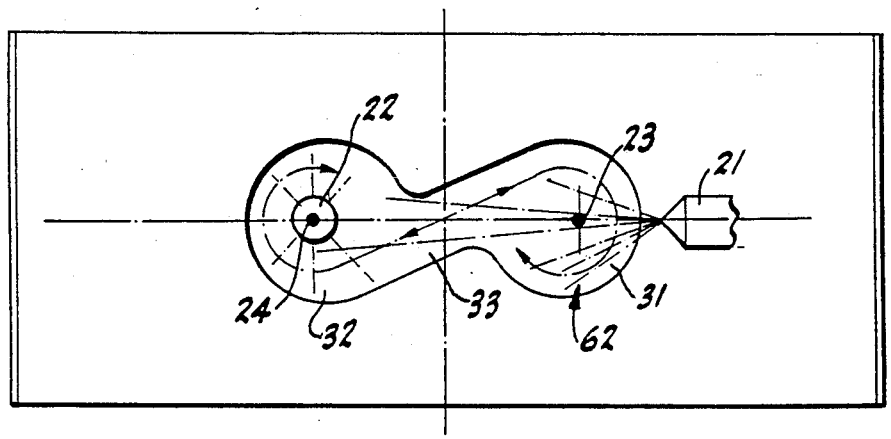

As the lean fuel and air charge is displaced in the chamber 64 formed between the rotor 30 and the housing 20, it becomes compressed and squeezed toward the precombustion chamber 62. As shown in FIG. 6, the precombustion chamber 62 includes regionalized chambers 31 and 32 interconnected by tangential channel 33. In this configuration fuel injectors 21 and 22 are oriented normal and inclined to their associated chamber 31 and 32, respectively, to impart a plume and swirl for maximized turbulence with tangential delivery from one chamber to the other through communicating channel 33. Each injector 21 and 22 has its associated spark plug 23 and 24, respectively to create a sequential combustion from successive ignition in the channel-separated, regionalized chambers 31 and 32 as shown in FIG. 2.

Both injectors 21 and 22 assisted by spark plugs 23 and 24 can work alternately, before the top center pilot (BTP) or after top center pilot (ATP). This arrangement provides maximum flexibility for mixture and combustion flame front control, and optimization of the combustion process to obtain effective combustion before expansion with the lowest level of pollution. The process of the high pressure, local volume intensification of the combustion in the thermal cycle permits an entire spectrum of mixture and combustion control from lean to stoichiometric.

The preferred construction of the high pressure fuel injectors 21 and 23 is shown in FIG. 4. Injector 11 can be of the same design as shown in FIG. 4 or of a conventional design as the pressure requirements are not as rigorous as in combustion injectors 21 and 22. The injector assembly 90 typical of injectors 11, 21 and 23 is coordinated with an ignition assembly controlled by the electronic control module 60. The injector assembly 90 includes a conventional high pressure pump 100 hydraulically coupled to a high pressure accumulator 101, which directs a supply liquid fuel under high pressure to the electromagnetic pulse valve 102 which controls the pulsed fuel delivery to the injector unit 104 under electronic control from the control module through line 92.

Each injector 11, 22, and 23 is similar in construction to the injector unit 104 with a housing structure 105 having a tip 106 coupled by a collar 94. The tip 106 has a needle 107, biased by the rod 108, spring 109 and adjustment bolt 110.

The high pressure fuel is conducted through the channels 111 to the cross orifices 112 in the plenum 113. The needle 107 is biased to close the nozzles 114 until a pulse of high pressure fuel produces the lift, h, of the needle with a corresponding opening of the nozzles 114 but a gradual restriction and closing of the cross orifices 112, obstructing the flow of fuel. On injection the pressure in the plenum 113 drops, permitting a return of the needle 107 and reopening of the orifices 112, which in turn reopens the fuel flow for another injection pulse. The beginning or initiation of the injection pulse and the length of the injection is regulated by the triggering system comprising synchronous rotary contacts 116, 117, and 118 which are producing timed signals for the electronic control module. The pulse which energizes the electromagnet 124 attracting the plunger valve 123 has a controlled pulse duration as shown in FIG. 4 and in the diagrams of FIGS. 5a, 5b, and 5c.

The high pressure fuel is directed to chambers 125 and 126 on both sides of piston valve 120. The electromagnetically controlled plunger valve 123 regulates when and how long exit 127 to return line 96 remains open. In the moment of opening of exit 127, the pressure in the chamber 126 is dropped and the pressure in the opposite chamber 125 acts to open the piston valve 120.

The flow passage of high pressure fuel is open through channel 122 to the injectors 105. When the electromagnet 124 is deenergized, the plunger valve 123 is released and pushed by bias spring 130 which closes the exit 127. The fuel pressure rises in the chamber 126 until balancing the pressure in the chamber 125 which in turn permits the valve 120 to close the channel 122 and end the injection.

The injector works in a regime of "hydraulic instability" or chatter, causing each fuel pulse to include multiple high frequency pulsations such that each burst of injected fuel is a series of lean and rich wave fronts of ultra small charges of highly atomized fuel. This further adds to efficient, rapid combustion when intensified by the turbulence created by the precombustion chamber design and the orientation of the injectors. The arrangement eliminates hot islands of high temperature common for continuous stream pulses and eliminates local rich mixtures that produce pollutants from incomplete combustion.

The electronic module 60 controls and generates the periodic sparks ignition under a cycle timed by the angular triggering devices 116, 117, and 118. A preferred regime coordinates the ignition as follows:

The control of the needle lift of injectors 11, 21, and 22 follow the sequential injection events x1, x2, and x3 as shown in FIGS. 5a, 5b, and 5c.

The control module 60 can make adjustments to the timing of the electromagnetic valve 123 to extend or contract pulse durations or adjust the start and stop in coordination with the timed triggering mechanism for optimum performance under various load and speed conditions.

Figure 3D:
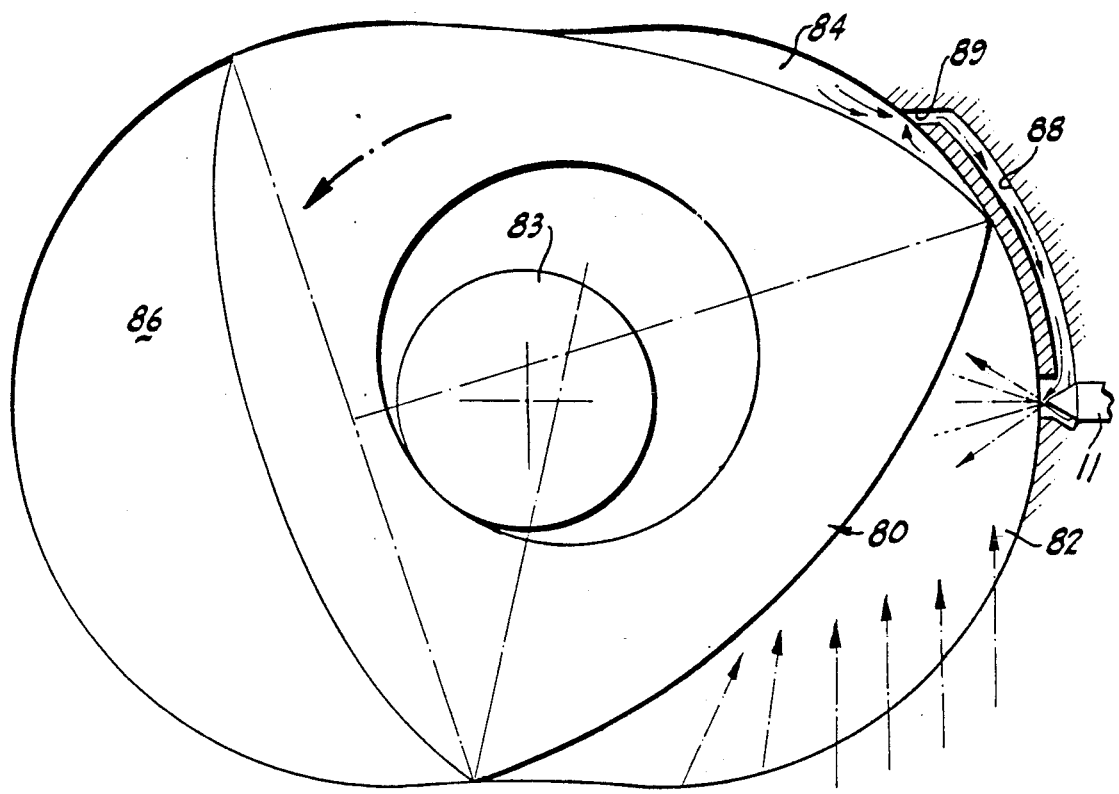

As shown in FIG. 3a, air sweeps into the compression subchamber 82, and is mixed with a pulse of subpulsed fuel from injector 11, while final compression and initiation of ignition occurs in combustion subchamber 84, initially localized in regional chambers 31 and 32. The position of the rotary piston is equivalent to six degrees before top dead center. Simultaneously, expansion of combusted gases occurs in expansion subchamber 86. In FIG. 3b, the equivalent of top dead center, turbulent mixing and combustion occurs in a fraction of a second such that combustion is virtually complete before the gases are allowed to expand into the reaches of the elongating dynamically awkward combustion subchamber that evolves into the expansion subchamber 86 as shown in FIG. 3c.

To improve the turbulence of the initial injection by injector 11, a by-pass passage 88 interconnecting the combustion subchamber 84 with the compression subchamber 82 is briefly available to provide a burst of high pressure fuel air mixture. The intake 89 is positioned such that it is eclipsed by the rotor just before combustion gases are produces at the intake 89.

The engine of this invention is designed to remove the restrictions of fixed geometry rotary engines and through the use of a novel injector system and volumetric control of the engine displacement and supercharging level allows the operation to be tuned to optimum performance. The variable displacement enables maintenance of a constant compression pressure by raising the initial intake volume when the turbocharger reduces the pressure and volume of delivered air at partial load and low rotation, and, by reducing the initial intake volume, the turbocharger produces a high pressure and volume of air for the rotary engine component.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A supercharged rotary engine comprising:
   an engine housing having an epitrochoidal chamber and an output drive shaft rotatably mounted in the housing;
   an eccentrically rotated rotor having multiple lobes mounted within the epitrochoidal chamber of the housing in engagement with the drive shaft wherein the rotor and the housing form a series of dynamic subchambers between adjacent lobes, one of the subchambers comprising a compression subchamber wherein air is compressed, the housing having an air intake periodically communicating with the compression subchamber on rotation of the rotor;
   a supercharger having a turbine side and a compressor side wherein the compressor side is in communication with the compressor subchamber through the air intake and supplies precompressed air to the compressor subchamber; and,
   means for varying the effective volumetric displacement of the compression subchamber in conjunction with the precompression of air by the supercharger comprising at least one displaceable plug valve in the housing wherein the duration of the compression cycle period is varied with the volumetric displacement of the subchamber decreasing as the pressure of the precompressed air increases.

2. The rotary engine of claim 1 comprising a plurality of displaceable plug valves in the engine housing wherein the duration of the compression cycle period is varied in stages.

3. The rotary engine of claim 2, having further an electronic control module wherein each plug valve is controlled by the electronic control module.

4. The rotary engine of claim 1 wherein the rotor has piston faces between adjacent lobes and each face has a recessed, precombustion chamber in the rotor.

5. The rotary engine of claim 4 wherein the recessed precombustion chamber comprises spaced regional chambers interconnected by a channel.

6. The rotary engine of claim 5 wherein the engine component includes at least two fuel injectors having nozzles with both nozzles directed toward the regional chambers.

7. The rotary engine of claim 6 wherein at least one injector is inclined and one injector is normal to the respective regional chambers for improving turbulence.

8. The rotary engine of claim 6 having a third injector in the housing directed at the compression subchamber for directing a spray of fuel into the compression subchamber for premixing the air with a lean mix of fuel.

9. The rotary engine of claim 8 wherein the housing and rotor form a combustion subchamber and the housing includes a periodically exposed bypass passage between the combustion subchamber and the compression subchamber.

10. The rotary engine of claim 6 wherein the injectors have a pulsed control sequence controlled by the electronic control module for producing timed pulses of fuel injection.

11. The rotary engine of claim 10 wherein the injectors have hydraulic means for producing multiple subpulses in each timed pulse of fuel injection.

12. The rotary engine of claim 1 wherein the supercharger comprises a counterrotating turbocharger.

13. The rotary engine of claim 9 having further a fuel injector with a nozzle, wherein the bypass passage has an opening into the compression subchamber and the fuel injector nozzle is located at the bypass opening into the compression subchamber.

* * * * *